US012531010B2

(12) United States Patent
Kim

(10) Patent No.: US 12,531,010 B2
(45) Date of Patent: Jan. 20, 2026

(54) PIXEL AND DISPLAY DEVICE INCLUDING THE SAME

(71) Applicant: Samsung Display Co., Ltd., Yongin-Si (KR)

(72) Inventor: Keunwoo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 18 days.

(21) Appl. No.: 18/505,137

(22) Filed: Nov. 9, 2023

(65) Prior Publication Data

US 2024/0304134 A1 Sep. 12, 2024

(30) Foreign Application Priority Data

Mar. 7, 2023 (KR) ........................ 10-2023-0029972

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01); *G09G 2300/0852* (2013.01); *G09G 2300/0861* (2013.01); *G09G 2310/08* (2013.01); *G09G 2320/02* (2013.01); *G09G 2320/045* (2013.01)

(58) Field of Classification Search
None
See application file for complete search history.

(56) References Cited

U.S. PATENT DOCUMENTS

| | | | | |
|---|---|---|---|---|
| 10,482,817 | B2 | 11/2019 | Kim et al. | |
| 10,902,778 | B2 | 1/2021 | Kim et al. | |
| 11,081,056 | B2 | 8/2021 | Park et al. | |
| 11,158,262 | B2 | 10/2021 | Gu et al. | |
| 11,348,522 | B2 | 5/2022 | Kim et al. | |
| 2012/0169707 | A1* | 7/2012 | Ebisuno | G09G 3/3233 345/212 |
| 2021/0398487 | A1* | 12/2021 | Toyoda | G09G 3/3233 |

FOREIGN PATENT DOCUMENTS

| | | | |
|---|---|---|---|
| CN | 108154846 | A | 6/2018 |
| KR | 10-2018-0064619 | A | 6/2018 |
| KR | 10-2019-0012303 | A | 2/2019 |
| KR | 10-2020-0023561 | A | 3/2020 |

* cited by examiner

*Primary Examiner* — Christopher R Lamb
(74) *Attorney, Agent, or Firm* — Innovation Counsel LLP

(57) ABSTRACT

A pixel is disclosed that includes a first transistor, a second transistor, a third transistor, a light emitting diode, a first capacitor, and a second capacitor. The first transistor includes a first gate electrode connected to a first node, a second gate electrode which receives a write gate signal or an emission control signal, a first electrode which receives a first power voltage, and a second electrode connected to a second node.

10 Claims, 13 Drawing Sheets

FIG. 6

| | COMPARATIVE EXAMPLE | EMBODIMENT |
|---|---|---|
| EMISSION DUTY (%) | 10.3 | 96.4 |
| INITIALIZATION PERIOD (H) | 80 | 80 |
| COMPENSATION PERIOD (H) | 40 | 40 |
| PROGRAMMING PERIOD(H) | 2880 | 1 |
| EMISSION PERIOD (H) | 345 | 3224 |

PIXEL AND DISPLAY DEVICE INCLUDING THE SAME

CROSS-REFERENCE TO RELATED APPLICATION(S)

This application claims priority under 35 USC § 119 to Korean Patent Application No. 10-2023-0029972 filed on Mar. 7, 2023 in the Korean Intellectual Property Office (KIPO), the entire disclosure of which is incorporated by reference herein.

BACKGROUND

1. Field

Embodiments relate to a display device. More particularly, embodiments related to a pixel having a small area and a high-resolution display device including the pixel.

2. Description of the Related Art

Methods of driving display devices may be classified as a simultaneous pixel-emission method and a sequential pixel-emission method. In the simultaneous emission method, all pixels may simultaneously emit light after data writing is sequentially completed on a row-by-row basis. In the sequential emission method, pixels may sequentially emit light on a row-by-row basis.

Recently, demand for high-resolution display devices has increased. In order to implement a high-resolution display device, an area of a pixel may be reduced.

SUMMARY

Embodiments may provide a pixel having a small area and an increased luminance.

Embodiments may provide a display device having an improved display quality by including the pixel.

A pixel according to embodiments may include a first transistor which includes a first gate electrode connected to a first node, a second gate electrode which receives a write gate signal, a first electrode which receives a first power voltage, and a second electrode connected to a second node, a second transistor which includes a gate electrode which receives the write gate signal, a first electrode connected to the first node, and a second electrode connected to a third node, a third transistor which includes a gate electrode which receives a compensation gate signal, a first electrode connected to the third node, and a second electrode connected to the second node, a light emitting diode which includes a first electrode connected to the second node and a second electrode which receives a second power voltage, a first capacitor which includes a first electrode connected to the third node and a second electrode which receives a data voltage, and a second capacitor which includes a first electrode connected to the first node and a second electrode which receives a third power voltage.

In an embodiment, a frame period may include an initialization period in which the first gate electrode of the first transistor and the first electrode of the light emitting diode are initialized, a compensation period in which a threshold voltage of the first transistor is compensated, a programming period in which the data voltage is written to the first gate electrode of the first transistor, and an emission period in which the light emitting diode emits a light.

In an embodiment, the write gate signal may transition from a turn-off voltage level to a turn-on voltage level in the initialization period, may have the turn-on voltage level in the compensation period and the emission period, and may have an intermediate voltage level between the turn-off voltage level and the turn-on voltage level in the programming period.

In an embodiment, the first power voltage may have a low voltage level in the initialization period, and may have a high voltage level in the compensation period and the emission period.

In an embodiment, the second power voltage may have a high voltage level in the initialization period and the compensation period, and may have a low voltage level in the emission period.

In an embodiment, the third power voltage may have a low voltage level in the initialization period, and may have a high voltage level in the compensation period, the programming period, and the emission period.

In an embodiment, the compensation gate signal may have a turn-on voltage level in the initialization period and the compensation period, and may have a turn-off voltage level in the programming period and the emission period.

A pixel according to embodiments may include a first transistor which includes a first gate electrode connected to a first node, a second gate electrode which receives an emission control signal, a first electrode which receives a first power voltage, and a second electrode connected to a second node, a second transistor which includes a gate electrode which receives a write gate signal, a first electrode connected to the first node, and a second electrode connected to a third node, a third transistor which includes a gate electrode which receives a compensation gate signal, a first electrode connected to the third node, and a second electrode connected to the second node, a light emitting diode which includes a first electrode connected to the second node and a second electrode which receives a second power voltage, a first capacitor which includes a first electrode connected to the third node and a second electrode which receives a data voltage, and a second capacitor which includes a first electrode connected to the first node and a second electrode which receives a third power voltage.

In an embodiment, a frame period may include an initialization period in which the first gate electrode of the first transistor and the first electrode of the light emitting diode are initialized, a compensation period in which a threshold voltage of the first transistor is compensated, a programming period in which the data voltage is written to the first gate electrode of the first transistor, and an emission period in which the light emitting diode emits a light.

In an embodiment, the write gate signal may transition from a turn-off voltage level to a turn-on voltage level in the initialization period, may have the turn-on voltage level in the compensation period and the programming period, and may have the turn-off voltage level in the emission period.

In an embodiment, the emission control signal may transition from a turn-off voltage level to a turn-on voltage level in the initialization period, may have the turn-off voltage level in the programming period, and may have the turn-on voltage level in the emission period.

In an embodiment, the first power voltage may have a low voltage level in the initialization period, and may have a high voltage level in the compensation period and the emission period.

In an embodiment, the second power voltage may have a high voltage level in the initialization period and the compensation period, and may have a low voltage level in the emission period.

A display device according to embodiments may include a display panel which includes a plurality of pixels and a panel driver which drives the display panel. Each of the plurality of pixels may include a first transistor which includes a first gate electrode connected to a first node, a second gate electrode which receives a write gate signal or an emission control signal, a first electrode which receives a first power voltage, and a second electrode connected to a second node, a second transistor which includes a gate electrode which receives the write gate signal, a first electrode connected to the first node, and a second electrode connected to a third node, a third transistor which includes a gate electrode which receives a compensation gate signal, a first electrode connected to the third node, and a second electrode connected to the second node, a light emitting diode which includes a first electrode connected to the second node and a second electrode which receives a second power voltage, a first capacitor which includes a first electrode connected to the third node and a second electrode which receives a data voltage, and a second capacitor which includes a first electrode connected to the first node and a second electrode which receives a third power voltage.

In an embodiment, a frame period of each of the plurality of pixels may include an initialization period in which the first gate electrode of the first transistor and the first electrode of the light emitting diode are initialized, a compensation period in which a threshold voltage of the first transistor is compensated, a programming period in which the data voltage is written to the first gate electrode of the first transistor, and an emission period in which the light emitting diode emits a light.

In an embodiment, the programming period and the emission period may be sequentially performed on a row-by-row basis in the plurality of pixels.

In an embodiment, the initialization period and the compensation period may be simultaneously performed in the plurality of pixels.

In an embodiment, the second gate electrode of the first transistor may receive the write gate signal. The write gate signal may transition from a turn-off voltage level to a turn-on voltage level in the initialization period, may have the turn-on voltage level in the compensation period and the emission period, and may have an intermediate voltage level between the turn-off voltage level and the turn-on voltage level in the programming period.

In an embodiment, the second gate electrode of the first transistor may receive the emission control signal. The write gate signal may transition from a turn-off voltage level to a turn-on voltage level in the initialization period, may have the turn-on voltage level in the compensation period and the programming period, and may have the turn-off voltage level in the emission period.

In an embodiment, the emission control signal may transition from a turn-off voltage level to a turn-on voltage level in the initialization period, may have the turn-off voltage level in the programming period, and may have the turn-on voltage level in the emission period.

In the pixel according to the embodiments, the light emitting diode may emit light based on a signal (the write gate signal or the emission control signal) applied to the second gate electrode of the first transistor, so that an emission duty of the pixel may increase and a luminance of the pixel may increase.

In the display device according to the embodiments, luminances of the pixels may increase, so that the display quality of the display device may be improved.

BRIEF DESCRIPTION OF THE DRAWINGS

Illustrative, non-limiting embodiments will be more clearly understood from the following detailed description taken in conjunction with the accompanying drawings.

FIG. 6 is a table for comparing a display device according to a comparative example and a display device according to an embodiment.

DETAILED DESCRIPTION OF THE EMBODIMENTS

Figure 1:
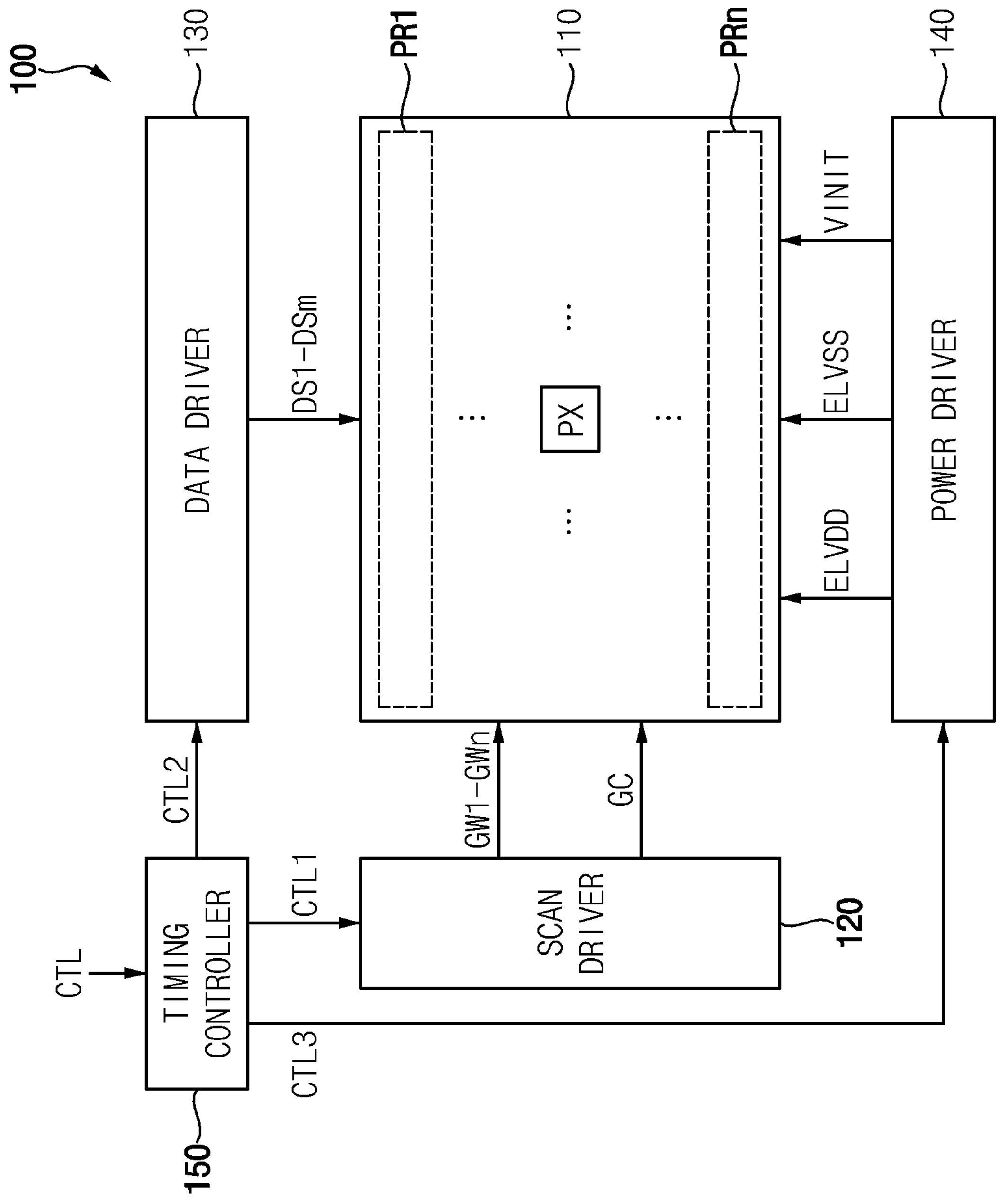
FIG. 1 is a block diagram illustrating a display device according to an embodiment.

Hereinafter, a pixel and a display device according to embodiments of the present disclosure will be described in more detail with reference to the accompanying drawings. The same or similar reference numerals will be used for the same elements in the accompanying drawings.

FIG. 1 is a block diagram illustrating a display device 100 according to an embodiment.

Referring to FIG. 1, the display device 100 may include a display panel 110 and a panel driver.

The display panel 110 may include a plurality of pixels PX. The pixels PX may define a plurality of first to $n^{th}$ pixel rows PR1-PRn, where n is a natural number greater than or equal to 2.

The panel driver may drive the display panel 110. The panel driver may include a scan driver 120, a data driver 130, a power driver 140, and a timing controller 150.

The scan driver 120 may generate first to $n^{th}$ write gate signals GW1-GWn and a compensation gate signal GC based on a first control signal CTL1. The scan driver 120 may respectively provide the first to $n^{th}$ write gate signals GW1-GWn to the first to $n^{th}$ pixel rows PR1-PRn, and may commonly provide the compensation gate signals GC to the first to $n^{th}$ pixel rows PR1-PRn. The first control signal CTL1 may include a vertical start signal, a scan clock signal, or the like.

The data driver 130 may generate first to $m^{th}$ data signals DS1-DSm based on a second control signal CTL2, where m is a natural number greater than or equal to 2. The data driver 130 may provide the first to $m^{th}$ data signals DS1-DSm to pixels included in a pixel row selected by the write gate signals GW1-GWn. The second control signal CTL2 may include a horizontal start signal, a load signal, a data clock signal, image data, or the like.

The power driver 140 may generate a first power voltage ELVDD, a second power voltage ELVSS, and a third power voltage VINIT based on a third control signal CTL3. The power driver 140 may commonly provide the first power voltage ELVDD, the second power voltage ELVSS, and the third power voltage VINIT to the pixels PX. The third control signal CTL3 may include a first switching signal for controlling a voltage level of the first power voltage ELVDD, a second switching signal for controlling a voltage level of the second power voltage ELVSS, and a third switching signal for controlling a voltage level of the third power voltage VINIT.

The timing controller 150 may control an operation of the scan driver 120, an operation of the data driver 130, and an operation of the power driver 140. The timing controller 150 may generate the first to third control signals CTL1, CTL2, and CTL3 based on a control signal CTL provided from the outside, and may provide the first control signal CTL1, the second control signal CTL2, and the third control signal CTL3 to the scan driver 120, the data driver 130, and the power driver 140, respectively.

Figure 2:
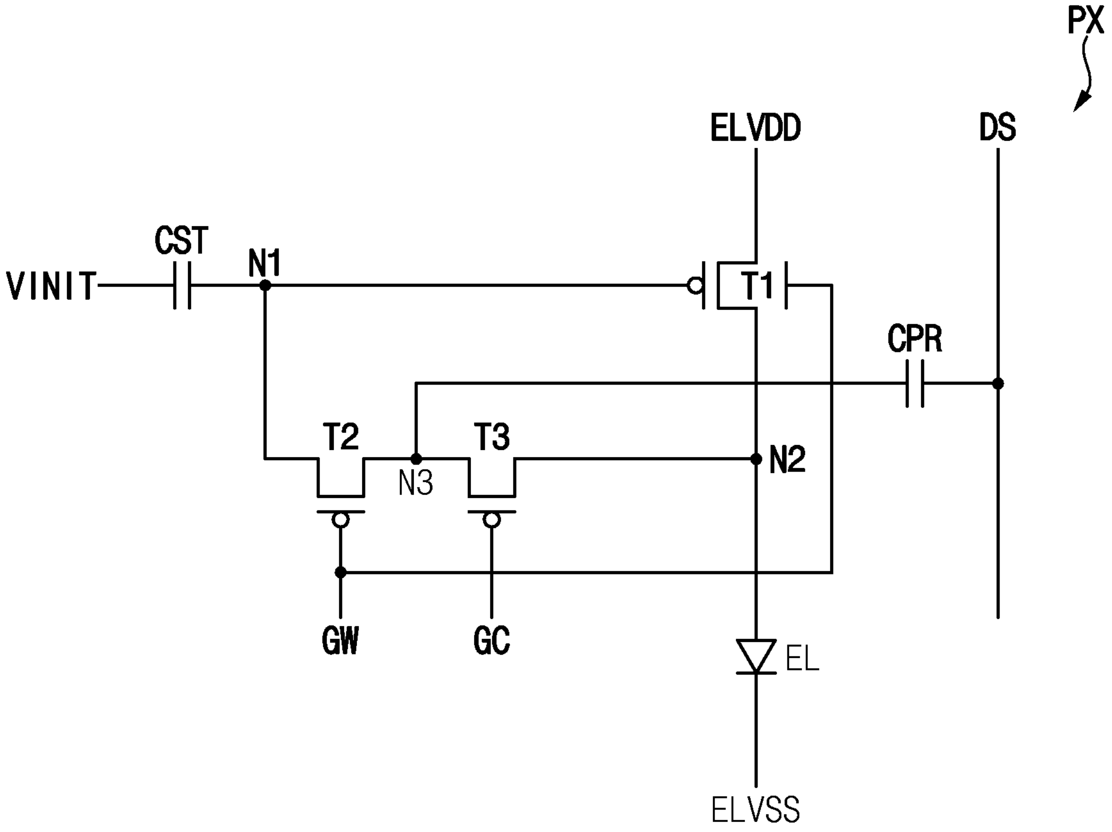
FIG. 2 is a circuit diagram illustrating a pixel included in the display device in FIG. 1.

FIG. 2 is a circuit diagram illustrating the pixel PX included in the display device 100 in FIG. 1.

Referring to FIG. 2, the pixel PX may include a first transistor T1, a second transistor T2, a third transistor T3, a light emitting diode EL, a first capacitor CPR, and a second capacitor CST.

The first transistor T1 may include a first gate electrode connected to a first node N1, a second gate electrode receiving a write gate signal GW, a first electrode receiving the first power voltage ELVDD, and a second electrode connected to a second node N2. The first transistor T1 may be a double gate transistor including two gate electrodes. The first transistor T1 may be turned-on or turned-off in response to a voltage of the first node N1 and the write gate signal GW. The first transistor T1 may be referred to as a driving transistor.

The second transistor T2 may include a gate electrode receiving the write gate signal GW, a first electrode connected to the first node N1, and a second electrode connected to a third node N3. The second transistor T2 may be turned-on or turned-off in response to the write gate signal GW. The second transistor T2 may be referred to as a write transistor.

The third transistor T3 may include a gate electrode receiving the compensation gate signal GC, a first electrode connected to the third node N3, and a second electrode connected to the second node N2. The third transistor T3 may be turned-on or turned-off in response to the compensation gate signal GC. The third transistor T3 may be referred to as a compensation transistor.

FIG. 2 illustrates an embodiment in which each of the first transistor T1, the second transistor T2, and the third transistor T3 is a P-type transistor (e.g., a PMOS transistor), but the present disclosure is not limited thereto. In another embodiment, at least one of the first transistor T1, the second transistor T2, and the third transistor T3 may be an N-type transistor (e.g., an NMOS transistor).

The light emitting diode EL may include a first electrode connected to the second node N2 and a second electrode receiving the second power voltage ELVSS. The light emitting diode EL may emit light based on a driving current provided from the first transistor T1.

The first capacitor CPR may include a first electrode connected to the third node N3 and a second electrode receiving a data signal DS. The third node N3 may be coupled to a data line transmitting the data signal DS by the first capacitor CPR. The first capacitor CPR may be referred to as a programming capacitor.

The second capacitor CST may include a first electrode connected to the first node N1 and a second electrode receiving the third power voltage VINIT. The first node N1 may be coupled to a third power line transmitting the third power voltage VINIT by the second capacitor CST. The second capacitor CST may be referred to as a storage capacitor.

Figure 3:
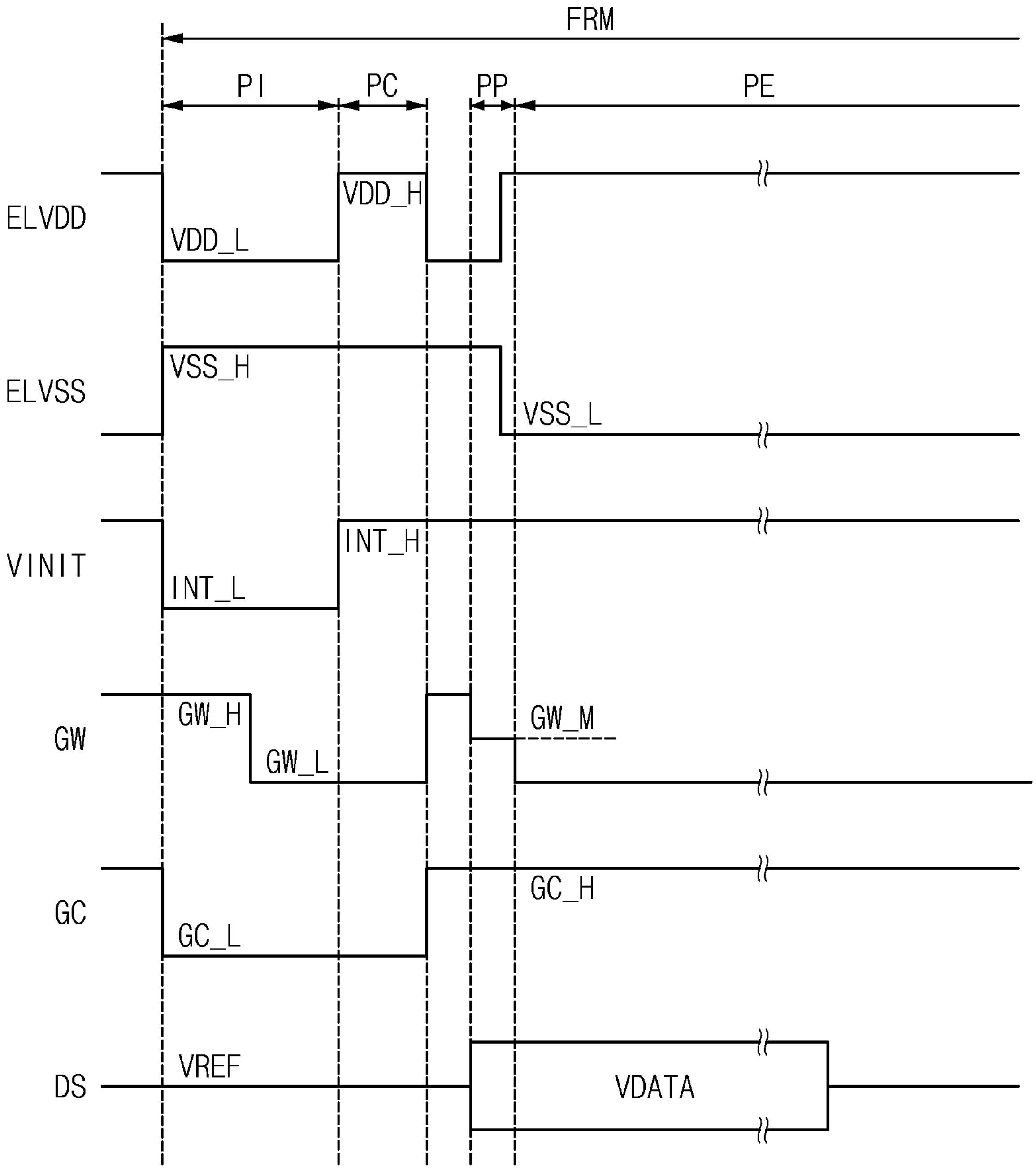
FIG. 3 is a waveform diagram for describing an operation of the pixel in FIG. 2.

FIG. 3 is a waveform diagram for describing an operation of the pixel PX in FIG. 2.

Referring to FIGS. 2 and 3, one frame period FRM of the pixel PX may include an initialization period PI, a compensation period PC, a programming period PP, and an emission period PE.

In the initialization period PI, the first gate electrode of the first transistor T1 and the first electrode of the light emitting diode EL may be initialized. In the compensation period PC, a threshold voltage of the first transistor T1 may be compensated. In the programming period PP, a data voltage VDATA may be written to the first gate electrode of the first transistor T1. In the emission period PE, the light emitting diode EL may emit light.

The first power voltage ELVDD may have a voltage level that varies in one frame period FRM. The first power voltage ELVDD may have a low voltage level VDD_L and a high voltage level VDD_H higher than the low voltage level VDD_L. For example, the low voltage level VDD_L of the first power voltage ELVDD may be about −7 V, and the high voltage level VDD_H of the first power voltage ELVDD may be about 6.5 V.

The second power voltage ELVSS may have a voltage level that varies in one frame period FRM. The second power voltage ELVSS may have a low voltage level VSS_L and a high voltage level VSS_H higher than the low voltage level VSS_L. For example, the low voltage level VSS_L of the second power voltage ELVSS may be about −11.5 V, and the high voltage level VSS_H of the second power voltage ELVSS may be about 6.5 V.

The third power voltage VINIT may have a voltage level that varies in one frame period FRM. The third power voltage VINIT may have a low voltage level INT_L and a high voltage level INT_H higher than the low voltage level INT_L. For example, the low voltage level INT_L of the third power voltage VINIT may be about −10 V, and the high voltage level INT_H of the third power voltage VINIT may be about 5.5 V.

The write gate signal GW may have a turn-off voltage level GW_H, a turn-on voltage level GW_L, and an intermediate voltage level GW_M between the turn-off voltage level GW_H and the turn-on voltage level GW_L. The turn-off voltage level GW_H of the write gate signal GW may be a voltage level for turning-off the first transistor T1 and the second transistor T2, and the turn-on voltage level GW_L of the write gate signal GW may be a voltage level for turning-on the first transistor T1 and the second transistor T2. For example, the turn-off voltage level GW_H of the write gate signal GW may be about 8 V, and the turn-on voltage level GW_L of the write gate signal GW may be about −8 V. The intermediate voltage level GW_M of the write gate signal GW may be a voltage level for turning-on the second transistor T2 and turning-off the first transistor T1.

Figure 4:
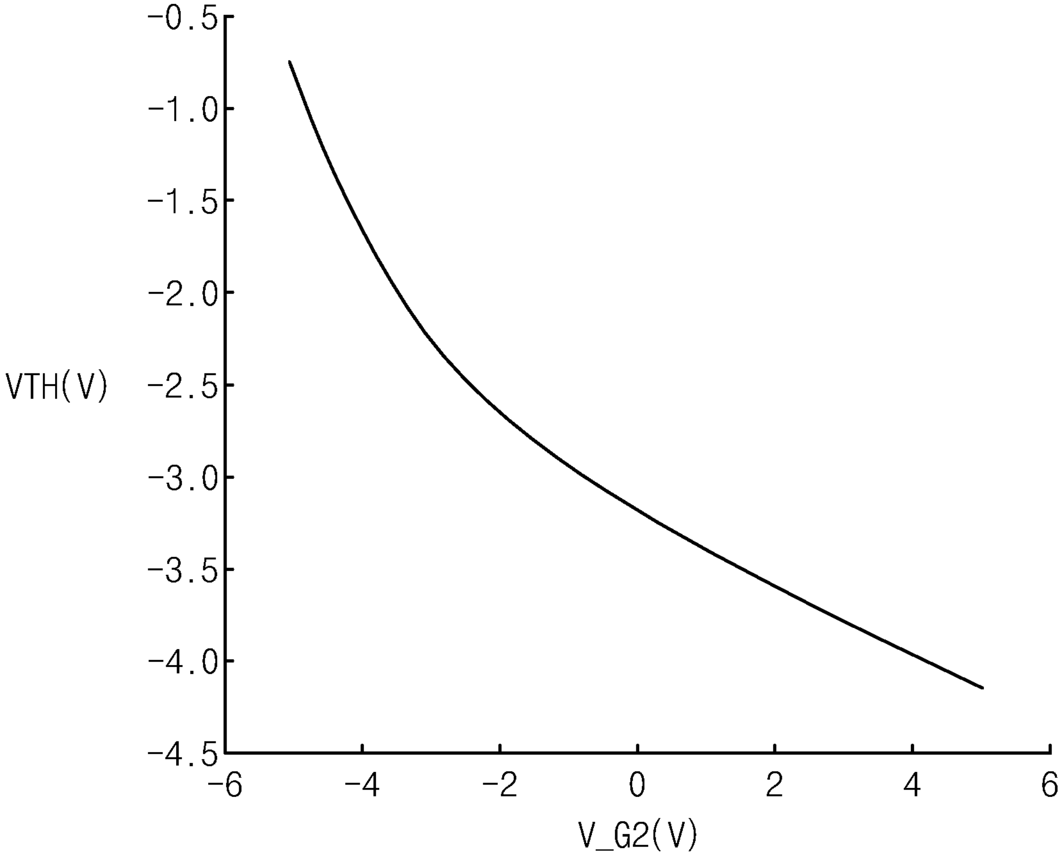
FIG. 4 is a graph illustrating a relationship between a voltage of a second gate electrode and a threshold voltage of a first transistor included in the pixel in FIG. 2.

FIG. 4 is a graph illustrating a relationship between a voltage V_G2 of the second gate electrode and the threshold voltage VTH of the first transistor T1 included in the pixel PX in FIG. 2.

Referring to FIGS. 2 and 4, a voltage level of the threshold voltage VTH of the first transistor T1 may decrease as the voltage V_G2 of the second gate electrode of the first transistor T1 increases, and the voltage level of the threshold voltage VTH of the first transistor T1 may increase as the voltage V_G2 of the second gate electrode of the first transistor T1 decreases. In other words, the threshold voltage VTH of the first transistor T1 may become higher as the voltage V_G2 of the second gate electrode of the first transistor T1 decreases, and the threshold voltage VTH of the first transistor T1 may become lower as the voltage V_G2 of the second gate electrode of the first transistor T1 increases. Accordingly, in a case that a voltage of the first gate electrode of the first transistor T1 (or the first node N1) has a turn-on voltage level, the first transistor T1 may be turned-off when the write gate signal GW having the turn-off voltage level GW_H (e.g., about 8 V) is applied to the second gate electrode of the first transistor T1, and the first transistor T1 may be turned-on when the write gate signal GW having the turn-on voltage level GW_L (e.g., about −8 V) is applied to the second gate electrode of the first transistor T1.

The first transistor T1 may be turned-off when the write gate signal GW having the intermediate voltage level GW_M is applied to the second gate electrode of the first transistor T1, and the second transistor T2 may be turned-on when the write gate signal GW having the intermediate voltage level GW_M is applied to the gate electrode of the second transistor T2. The intermediate voltage level GW_M of the write gate signal GW may be a voltage level insufficient to turn-on the first transistor T1, but may be a voltage level sufficient to turn-on the second transistor T2. When the write gate signal GW having the intermediate voltage level GW_M is applied to the second gate electrode of the first transistor T1, the threshold voltage VTH of the first transistor T1 may not become low enough to turn-on the first transistor T1.

Referring to FIGS. 2 and 3 again, the compensation gate signal GC may have a turn-off voltage level GC_H and a turn-on voltage level GC_L. The turn-off voltage level GC_H of the compensation gate signal GC may be a voltage level for turning-off the third transistor T3, and the turn-on voltage level GC_L of the compensation gate signal GC may be a voltage level for turning-on the third transistor T3. For example, the turn-off voltage level GC_H of the compensation gate signal GC may be about 8 V, and the turn-on voltage level GC_L of the compensation gate signal GC may be about −8 V.

The data signal DS may have a reference voltage VREF in the initialization period PI and the compensation period PC, and may have the data voltage VDATA in the programming period PP. For example, a voltage level of the reference voltage VREF may be about 3 V, and a voltage level of the data voltage VDATA may be about 2 V to about 5 V. For example, the voltage level of the data voltage VDATA corresponding to the white grayscale may be about 2 V, and the voltage level of the data voltage VDATA corresponding to the black grayscale may be about 5V.

In the initialization period PI, the first power voltage ELVDD may have the low voltage level VDD_L, the second power voltage ELVSS may have the high voltage level VSS_H, the third power voltage VINIT may have the low voltage level INT_L, the write gate signal GW may transition from the turn-off voltage level GW_H to the turn-on voltage level GW_L, and the compensation gate signal GC may have the turn-on voltage level GC_L. Accordingly, a current path may be formed from the third power line transmitting the third power voltage VINIT to the first power line transmitting the first power voltage ELVDD through the second capacitor CST, the second transistor T2, the third transistor T3, and the first transistor T1, and the first gate electrode of the first transistor T1 (or the first node N1) and the first electrode of the light emitting diode EL (or the second node N2) may be initialized.

In the compensation period PC, the first power voltage ELVDD may have the high voltage level VDD_H, the second power voltage ELVSS may have the high voltage level VSS_H, the third power voltage VINIT may have the high voltage level INT_H, the write gate signal GW may have the turn-on voltage level GW_L, and the compensation gate signal GC may have the turn-on voltage level GC_L. Accordingly, the first transistor T1 may be diode-connected (i.e., the first gate electrode and the second electrode of the first transistor T1 may be connected), and a voltage reflecting the threshold voltage of the first transistor T1 may be stored in the first node N1. Accordingly, the threshold voltage of the first transistor T1 may be compensated.

In the programming period PP, the third power voltage VINIT may have the high voltage level INT_H, the write gate signal GW may have the intermediate voltage level GW_M, the compensation gate signal GC may have the turn-off voltage level GC_H, and the data signal DS may have the data voltage VDATA. Accordingly, the first transistor T1 and the third transistor T3 may be turned-off, and the second transistor T2 may be turned-on. Accordingly, the data voltage VDATA may be written to the first gate electrode of the first transistor T1 (or the first node N1).

In the emission period PE, the first power voltage ELVDD may have the high voltage level VDD_H, the second power voltage ELVSS may have the low voltage level VSS_L, the third power voltage VINIT may have the high voltage level INT_H, the write gate signal GW may have the turn-on voltage level GW_L, and the compensation gate signal GC may have the turn-off voltage level GC_H. Accordingly, the first transistor T1 may be turned-on, and the first transistor T1 may provide a driving current corresponding to the data voltage VDATA in which the threshold voltage of the first transistor T1 is compensated to the light emitting diode EL. Accordingly, the light emitting diode EL may emit light based on the driving current.

Figure 5:
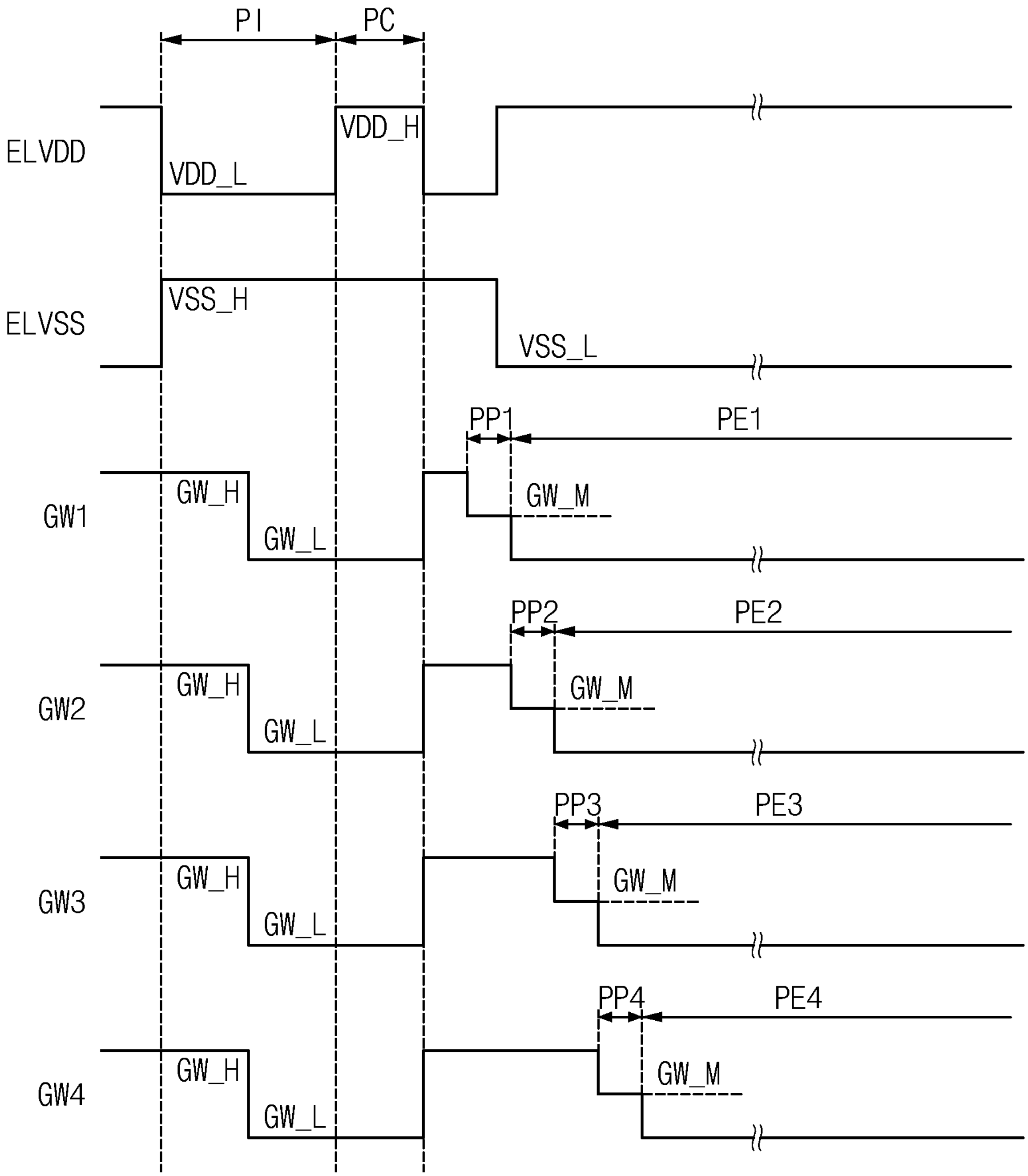
FIG. 5 is a waveform diagram illustrating write gate signals provided from a scan driver included in the display device in FIG. 1.

FIG. 5 is a waveform diagram illustrating write gate signals GW1, GW2, GW3, and GW4 provided from the scan driver 120 included in the display device 100 in FIG. 1.

Referring to FIGS. 1 and 5, the scan driver 120 may provide first to fourth write gate signals GW1, GW2, GW3, and GW4 to the first to fourth pixel rows, respectively.

The initialization period PI and the compensation period PC of one frame period may be simultaneously performed in the plurality of pixels PX. As illustrated in FIG. 5, timings of the initialization period PI and the compensation period PC of pixels included in the first to fourth pixel rows may be the same. Accordingly, the initialization period PI and the compensation period PC of the pixels included in the first to fourth pixel rows may be simultaneously performed.

The programming period and the emission period of one frame period may be sequentially performed on a row-by-row basis in the plurality of pixels PX. As illustrated in FIG. 5, a second programming period PP2 and a second emission period PE2 of pixels included in the second pixel row may be respectively shifted by one programming period (e.g., 1 horizontal time (H)) from a first programming period PP1 and a first emission period PE1 of pixels included in the first pixel row, a third programming period PP3 and a third emission period PE3 of pixels included in the third pixel row may be respectively shifted by one programming period from the second programming period PP2 and the second emission period PE2, and a fourth programming period PP4 and a fourth emission period PE4 of pixels included in the fourth pixel row may be respectively shifted by one programming period from the third programming period PP3 and the third emission period PE3. Accordingly, the first to fourth programming periods PP1, PP2, PP3, and PP4 and the first to fourth emission periods PE1, PE2, PE3, and PE4 of the pixels included in the first to fourth pixel rows may be sequentially performed on a row-by-row basis.

The first power voltage ELVDD may transition from the low voltage level VDD_L to the high voltage level VDD_H before the start of the first emission period PE1, and the second power voltage ELVSS may transition from the high voltage level VSS_H to the low voltage level VSS_L before the start of the first emission period PE1. Accordingly, the pixels included in the first pixel row may emit light in the first emission period PE1. Since the second to fourth emission periods PE2, PE3, and PE4 are performed after the first emission period PE1, the pixels included in the second to fourth pixel rows may also normally emit light in the second to fourth emission periods PE2, PE3, and PE4.

FIG. 5 illustrates an embodiment in which the first power voltage ELVDD transitions from the low voltage level VDD_L to the high voltage level VDD_H in the first programming period PP1 and the second power voltage ELVSS transitions from the high voltage level VSS_H to the low voltage level VSS_L in the first programming period PP1, but the present disclosure is not limited thereto. In another embodiment, the first power voltage ELVDD may transition from the low voltage level VDD_L to the high voltage level VDD_H before the start of the first programming period PP1, and the second power voltage ELVSS may transition from the high voltage level VSS_H to the low voltage level VSS_L before the start of the first programming period PP1.

FIG. 6 is a table for comparing a display device according to a comparative example and a display device according to an embodiment.

Referring to FIGS. 1, 5, and 6, in the comparative example, the initialization period, the compensation period, and the emission period may be simultaneously performed in the pixels, and the programming period may be sequentially performed on a row-by-row basis in the pixels. The emission period may be simultaneously performed in the pixels after the programming period is sequentially performed on a row-by-row basis in the pixels. In other words, the display device according to the comparative example may be driven in a simultaneous emission method in which the pixels simultaneously emit light. When the number of pixel rows is 2880, in the comparative example, the initialization period may be 80 horizontal times, the compensation period may be 40 horizontal times, the programming period may be 2880 horizontal times, and the emission period may be 345 horizontal times. Accordingly, in the comparative example, an emission duty, which is a ratio of the emission period to one frame period, may be about 10.3% (=345/(80+40+2880+345)).

In the embodiment, the initialization period PI and the compensation period PC may be simultaneously performed in the pixels PX, and the programming period PP and the emission period PE may be sequentially performed on a row-by-row basis in the pixels PX. In other words, the display device 100 according to the embodiment may be driven in a sequential emission method in which the pixels PX sequentially emit light on a row-by-row basis. In the embodiment, the initialization period may be 80 horizontal times, the compensation period may be 40 horizontal times, the programming period may be 1 horizontal time, and the emission period may be 3224 horizontal times. Accordingly, in the embodiment, the emission duty may be about 96.4% (=3224/(80+40+1+3224)).

The emission duty of the display device 100 according to the embodiment driven in the sequential emission method may be 9 times or more of the emission duty of the display device according to the comparative example driven in the simultaneous emission method, and accordingly, luminance of the display device 100 according to the embodiment may be greater than luminance of the display device according to the comparative example. Accordingly, in the embodiment, the display device 100 may be driven in the sequential emission method, so that the luminance of the display device 100 may increase, and the display quality of the display device 100 may be improved.

Figure 7:
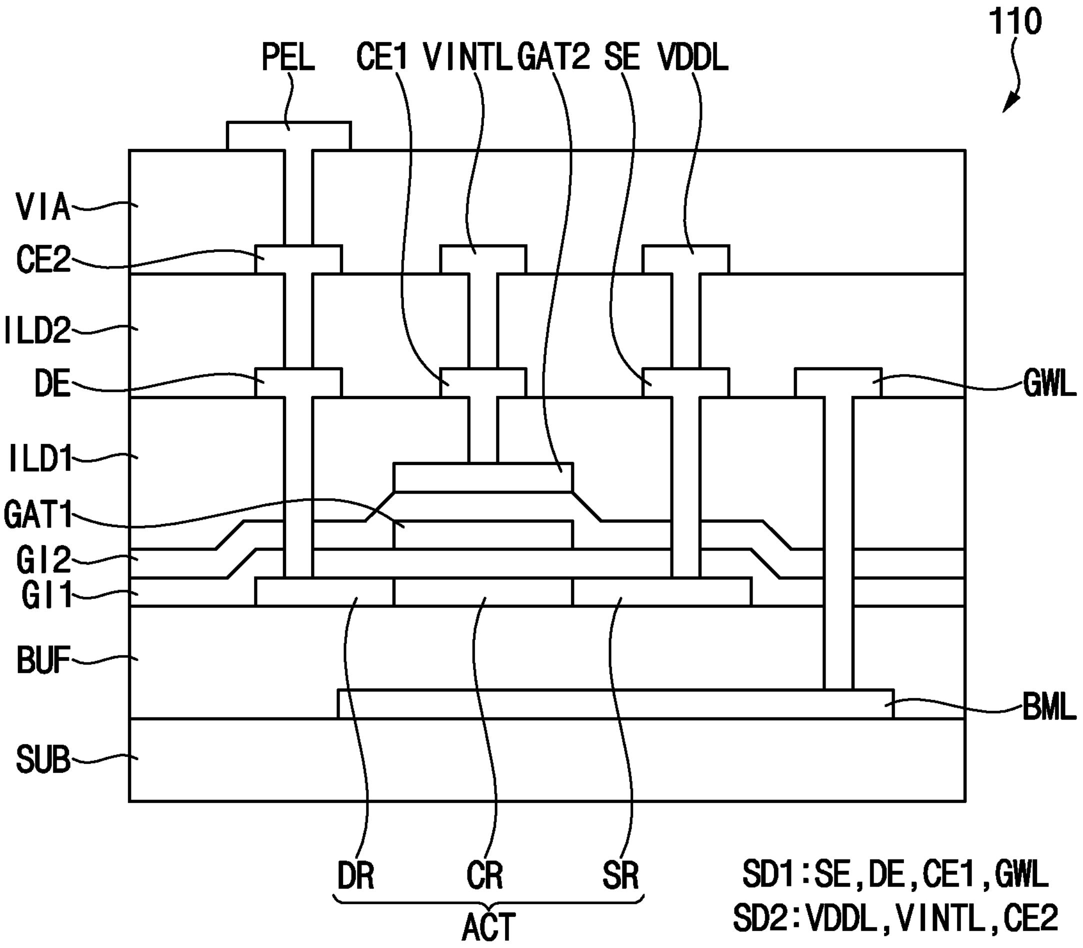
FIG. 7 is a cross-sectional view illustrating a display panel according to an embodiment.

FIG. 7 is a cross-sectional view illustrating the display panel 110 according to an embodiment. For example, FIG. 7 may illustrate some elements (e.g., the first transistor T1 and the second capacitor CST) of the pixel PX in FIG. 2.

Referring to FIG. 7, the display panel 110 may include a substrate SUB, a lower conductive layer BML, a buffer layer BUF, an active layer ACT, a first gate insulation layer GI1, a first gate layer GAT1, a second gate insulation layer GI2, a second gate layer GAT2, a first insulation interlayer ILD1, a first source-drain layer SD1, a second insulation interlayer ILD2, a second source-drain layer SD2, a via insulation layer VIA, and a pixel electrode layer PEL.

The substrate SUB may include a rigid material such as glass or a flexible material such as plastic.

The lower conductive layer BML may be disposed on the substrate SUB. The lower conductive layer BML may include a conductive material such as metal.

The buffer layer BUF may be disposed on the lower conductive layer BML. The buffer layer BUF may include an inorganic insulation material such as silicon nitride, silicon oxide, or the like. The buffer layer BUF may insulate between the lower conductive layer BML and the active layer ACT.

The active layer ACT may be disposed on the buffer layer BUF. The active layer ACT may include a silicon semiconductor such as polycrystalline silicon, amorphous silicon, or the like or an oxide semiconductor. The active layer ACT may include a source region SR, a drain region DR, and a channel region CR. Impurities may be implanted into the source region SR and the drain region DR, and the channel region CR may be disposed between the source region SR and the drain region DR.

The first gate insulation layer GI1 may be disposed on the active layer ACT. The first gate insulation layer GI1 may include an inorganic insulation material such as silicon nitride, silicon oxide, or the like. The first gate insulation layer GI1 may insulate between the active layer ACT and the first gate layer GAT1.

The first gate layer GAT1 may be disposed on the first gate insulation layer GI1. The first gate layer GAT1 may include a conductive material such as metal. The first gate layer GAT1 may correspond to the first electrode of the second capacitor CST of the pixel PX in FIG. 2.

In an embodiment, the first gate layer GAT1 may correspond to the first gate electrode of the first transistor T1 of the pixel PX in FIG. 2, and the lower conductive layer BML may correspond to the second gate electrode of the first transistor T1 of the pixel PX in FIG. 2.

The second gate insulation layer GI2 may be disposed on the first gate layer GAT1. The second gate insulation layer GI2 may include an inorganic insulation material such as silicon nitride, silicon oxide, or the like. The second gate insulation layer GI2 may insulate between the first gate layer GAT1 and the second gate layer GAT2.

The second gate layer GAT2 may be disposed on the second gate insulation layer GI2. The second gate layer GAT2 may include a conductive material such as metal. The second gate layer GAT2 may correspond to the second electrode of the second capacitor CST of the pixel PX in FIG. 2.

The first insulation interlayer ILD1 may be disposed on the second gate layer GAT2. The first insulation interlayer ILD1 may include an inorganic insulation material such as silicon nitride, silicon oxide, or the like and/or an organic insulation material such as polyimide. The first insulation interlayer ILD1 may insulate between the second gate layer GAT2 and the first source-drain layer SD1.

The first source-drain layer SD1 may be disposed on the first insulation interlayer ILD1. The first source-drain layer SD1 may include a conductive material such as metal. The first source-drain layer SD1 may include a source electrode SE, a drain electrode DE, a first connection electrode CE1, and a write gate line GWL.

The source electrode SE may be connected to the source region SR through a contact hole. The source electrode SE may correspond to the first electrode of the first transistor T1 of the pixel PX in FIG. 2.

The drain electrode DE may be connected to the drain region DR through a contact hole. The drain electrode DE may correspond to the second electrode of the first transistor T1 of the pixel PX in FIG. 2.

The first connection electrode CE1 may be connected to the second gate layer GAT2 through a contact hole.

The write gate line GWL may be connected to the lower conductive layer BML through a contact hole. The write gate line GWL may transmit the write gate signal GW provided to the pixel PX in FIG. 2.

The second insulation interlayer ILD2 may be disposed on the first source-drain layer SD1. The second insulation interlayer ILD2 may include an inorganic insulation material such as silicon nitride, silicon oxide, or the like and/or an organic insulation material such as polyimide. The second insulation interlayer ILD2 may insulate between the first source-drain layer SD1 and the second source-drain layer SD2.

The second source-drain layer SD2 may be disposed on the second insulation interlayer ILD2. The second source-drain layer SD2 may include a conductive material such as metal. The second source-drain layer SD2 may include a first power line VDDL, a third power line VINTL, and a second connection electrode CE2.

The first power line VDDL may be connected to the source electrode SE through a contact hole. The first power line VDDL may transmit the first power voltage ELVDD provided to the pixel PX in FIG. 2.

The third power line VINTL may be connected to the first connection electrode CE1 through the contact hole. The third power line VINTL may transmit the third power voltage VINIT provided to the pixel PX in FIG. 2.

The second connection electrode CE2 may be connected to the drain electrode DE through a contact hole.

The via insulation layer VIA may be disposed on the second source-drain layer SD2. The via insulation layer VIA may include an inorganic insulation material such as silicon nitride, silicon oxide, or the like and/or an organic insulation material such as polyimide. The via insulation layer VIA may insulate between the second source-drain layer SD2 and the pixel electrode layer PEL.

The pixel electrode layer PEL may be disposed on the via insulation layer VIA. The pixel electrode layer PEL may include a conductive material such as metal and/or a transparent conductive oxide such as ITO. The pixel electrode layer PEL may correspond to the first electrode of the light emitting diode EL of the pixel PX in FIG. 2.

Figure 8:
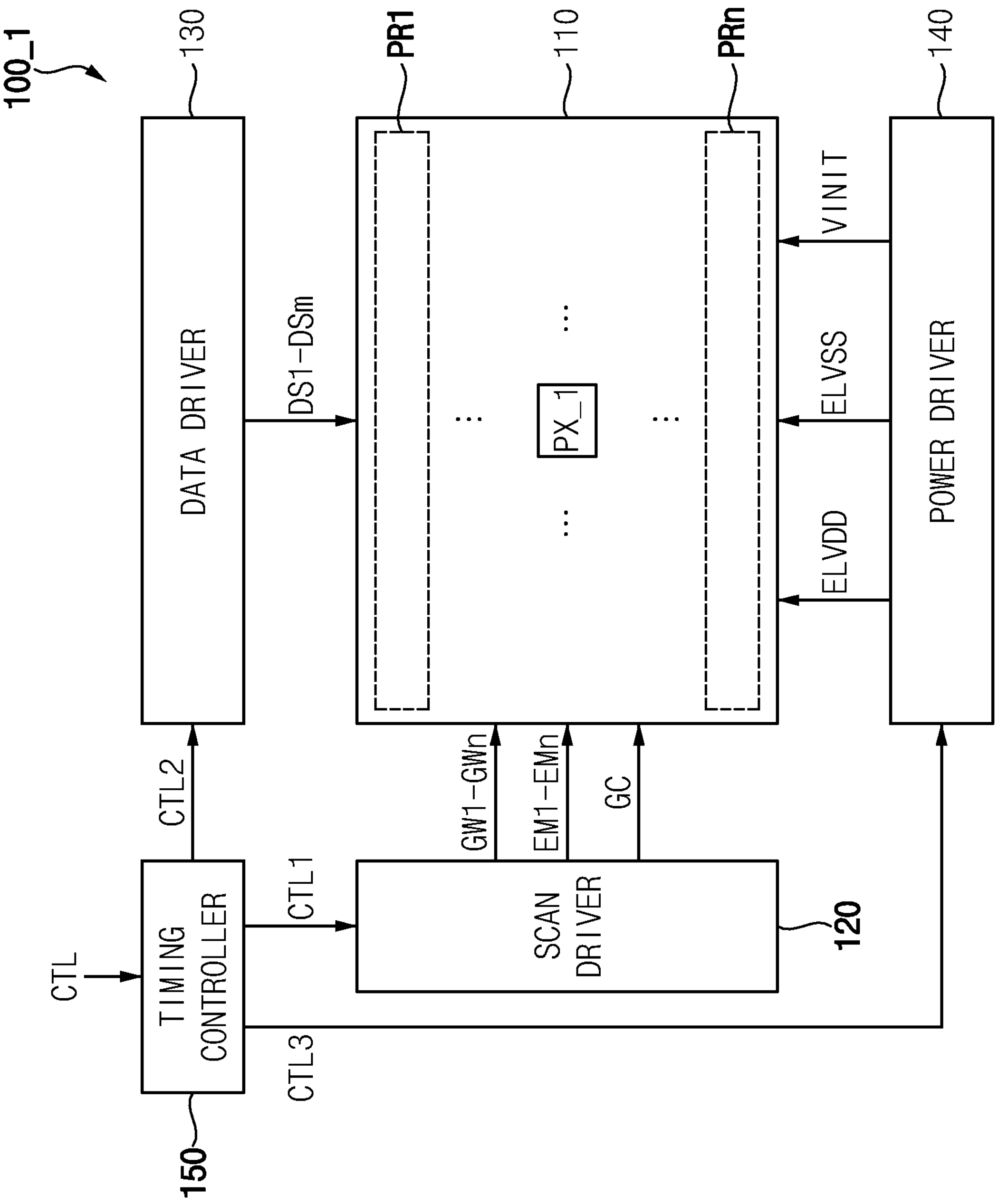
FIG. 8 is a block diagram illustrating a display device according to an embodiment.

FIG. 8 is a block diagram illustrating a display device 100_1 according to an embodiment.

Referring to FIG. 8, the display device 100_1 may include a display panel 110 including a plurality of pixels PX_1 and a panel driver including a scan driver 120, a data driver 130, a power driver 140, and a timing controller 150. Descriptions of components of the display device 100_1 described with reference to FIG. 8, which are substantially the same as or similar to those of the display device 100 described with reference to FIG. 1, will not be repeated.

The scan driver 120 may generate the first to $n^{th}$ write gate signals GW1-GWn, first to $n^{th}$ emission control signals EM1-EMn, and the compensation gate signal GC based on the first control signal CTL1. The scan driver 120 may respectively provide the first to $n^{th}$ write gate signals GW1-GWn to the first to $n^{th}$ pixel rows PR1-PRn, may respectively provide the first to $n^{th}$ emission control signals EM1-EMn to the first to $n^{th}$ pixel rows PR1-PRn, and may commonly provide the compensation gate signal GC to the first to $n^{th}$ pixel rows PR1-PRn.

Figure 9:
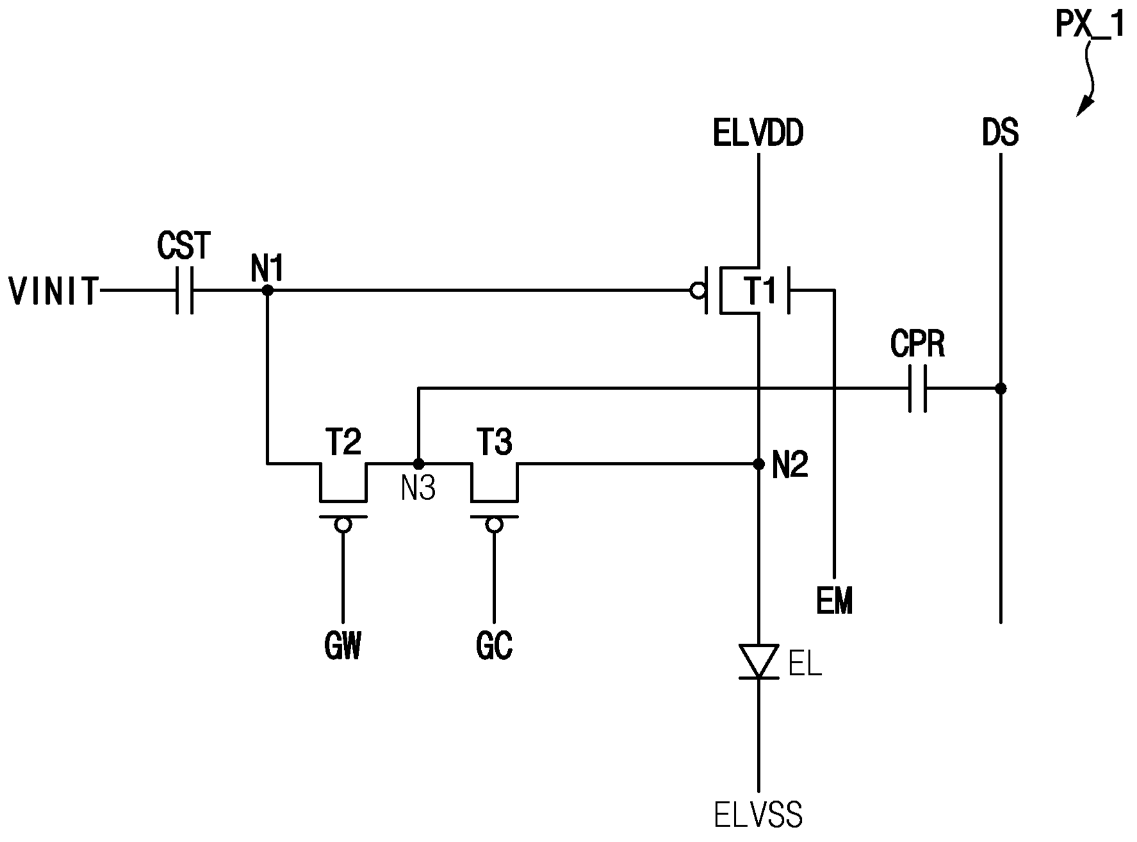
FIG. 9 is a circuit diagram illustrating a pixel included in the display device in FIG. 8.

FIG. 9 is a circuit diagram illustrating the pixel PX_1 included in the display device 100_1 in FIG. 8.

Referring to FIG. 9, the pixel PX_1 may include a first transistor T1, a second transistor T2, a third transistor T3, a light emitting diode EL, a first capacitor CPR, and a second capacitor CST. Descriptions of components of the pixel PX_1 described with reference to FIG. 9, which are substantially the same as or similar to those of the pixel PX described with reference to FIG. 2, will not be repeated.

The first transistor T1 may include a first gate electrode connected to the first node N1, a second gate electrode receiving an emission control signal EM, a first electrode receiving the first power voltage ELVDD, and a second electrode connected to the second node N2. The first transistor T1 may be a double gate transistor including two gate electrodes. The first transistor T1 may be turned-on or turned-off in response to a voltage of the first node N1 and the emission control signal EM.

Figure 10:
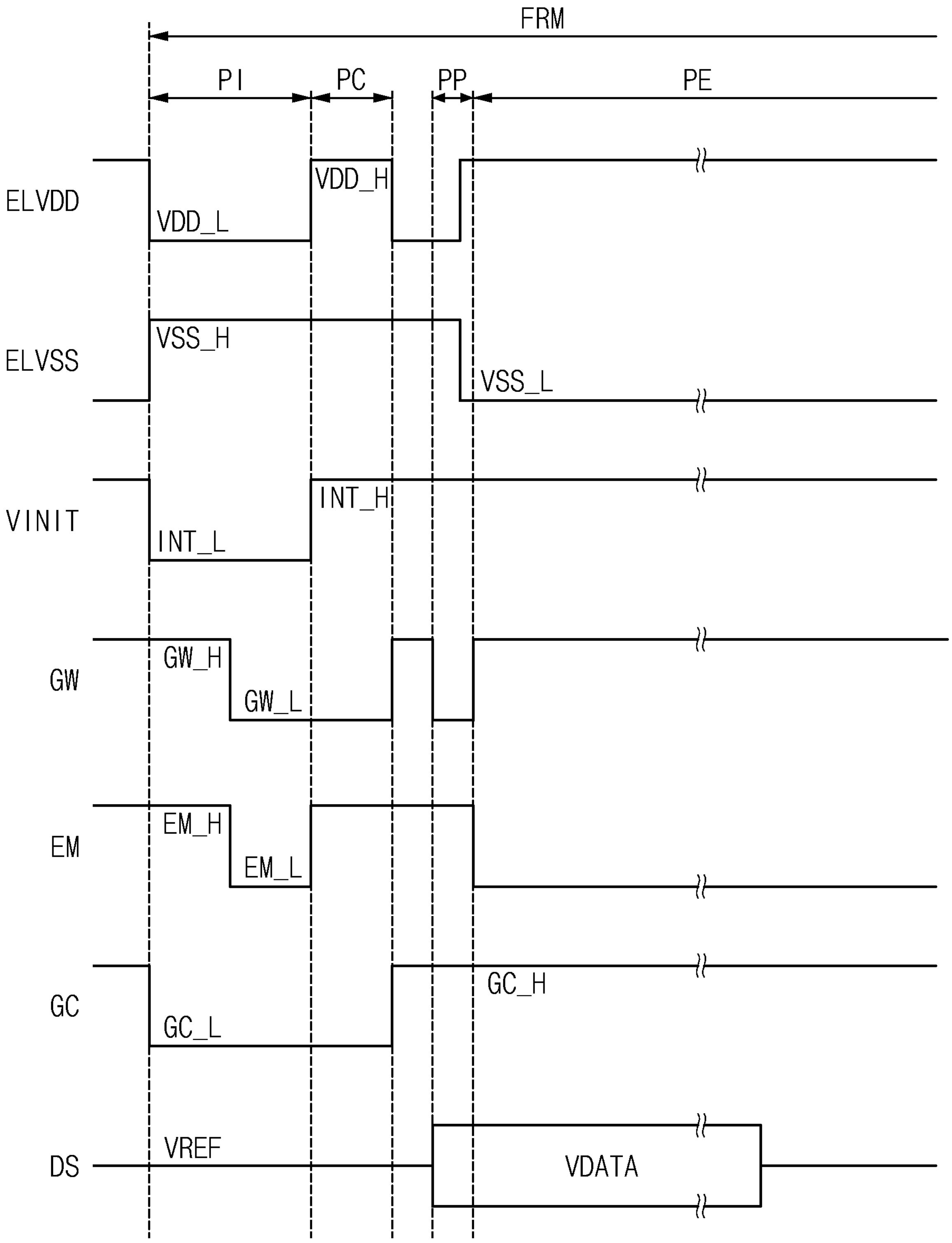
FIG. 10 is a waveform diagram for describing an operation of the pixel in FIG. 9.

FIG. 10 is a waveform diagram for describing an operation of the pixel PX_1 in FIG. 9.

Referring to FIGS. 9 and 10, one frame period FRM of the pixel PX_1 may include an initialization period PI, a compensation period PC, a programming period PP, and an emission period PE. Descriptions of steps of the operation of the pixel PX_1 described with reference to FIGS. 9 and 10, which are substantially the same as or similar to those of the operation of the pixel PX described with reference to FIGS. 2 and 3, will not be repeated.

The write gate signal GW may have a turn-off voltage level GW_H and a turn-on voltage level GW_L. The turn-off voltage level GW_H of the write gate signal GW may be a voltage level for turning-off the second transistor T2, and the turn-on voltage level GW_L of the write gate signal GW may be a voltage level for turning-on the second transistor T2.

The emission control signal EM may have a turn-off voltage level EM_H and a turn-on voltage level EM_L. The turn-off voltage level EM_H of the emission control signal EM may be a voltage level for turning-off the first transistor T1, and the turn-on voltage level EM_L of the emission control signal EM may be a voltage level for turning-on the first transistor T1. For example, the turn-off voltage level EM_H of the emission control signal EM may be about 8 V, and the turn-on voltage level EM_L of the emission control signal EM may be about −8 V.

In the initialization period PI, the first power voltage ELVDD may have the low voltage level VDD_L, the second power voltage ELVSS may have the high voltage level VSS_H, the third power voltage VINIT may have the low voltage level INT_L, the write gate signal GW may transition from the turn-off voltage level GW_H to the turn-on voltage level GW_L, the emission control signal EM may transition from the turn-off voltage level EM_H to the turn-on voltage level EM_L, and the compensation gate signal GC may have the turn-on voltage level GC_L. Accordingly, a current path may be formed from the third power line transmitting the third power voltage VINIT to the first power line transmitting the first power voltage ELVDD through the second capacitor CST, the second transistor T2, the third transistor T3, and the first transistor T1, and the first gate electrode of the first transistor T1 (or the first node N1) and the first electrode of the light emitting diode EL (or the second node N2) may be initialized.

In the compensation period PC, the first power voltage ELVDD may have the high voltage level VDD_H, the second power voltage ELVSS may have the high voltage level VSS_H, the third power voltage VINIT may have the high voltage level INT_H, the write gate signal GW may have the turn-on voltage level GW_L, the emission control signal EM may have the turn-off voltage level EM_H, and the compensation gate signal GC may have the turn-on voltage level GC_L. Accordingly, the first transistor T1 may be diode-connected (i.e., the first gate electrode and the second electrode of the first transistor T1 may be connected), and a voltage reflecting the threshold voltage of the first transistor T1 may be stored in the first node N1. Accordingly, the threshold voltage of the first transistor T1 may be compensated.

In the programming period PP, the third power voltage VINIT may have the high voltage level INT_H, the write gate signal GW may have the turn-on voltage level GW_L, the emission control signal EM may have the turn-off voltage level EM_H, the compensation gate signal GC may have the turn-off voltage level GC_H, and the data signal DS may have the data voltage VDATA. Accordingly, the first transistor T1 and the third transistor T3 may be turned-off, and the second transistor T2 may be turned-on. Accordingly, the data voltage VDATA may be written to the first gate electrode of the first transistor T1 (or the first node N1).

In the emission period PE, the first power voltage ELVDD may have the high voltage level VDD_H, the second power voltage ELVSS may have the low voltage level VSS_L, the third power voltage VINIT may have the high voltage level INT_H, the write gate signal GW may have the turn-off voltage level GW_H, the emission control signal EM may have the turn-on voltage level EM_L, and the compensation gate signal GC may have the turn-off voltage level GC_H. Accordingly, the first transistor T1 may be turned-on, and the first transistor T1 may provide a driving current corresponding to the data voltage VDATA in which the threshold voltage of the first transistor T1 is compensated to the light emitting diode EL. Accordingly, the light emitting diode EL may emit light based on the driving current.

Figure 11:
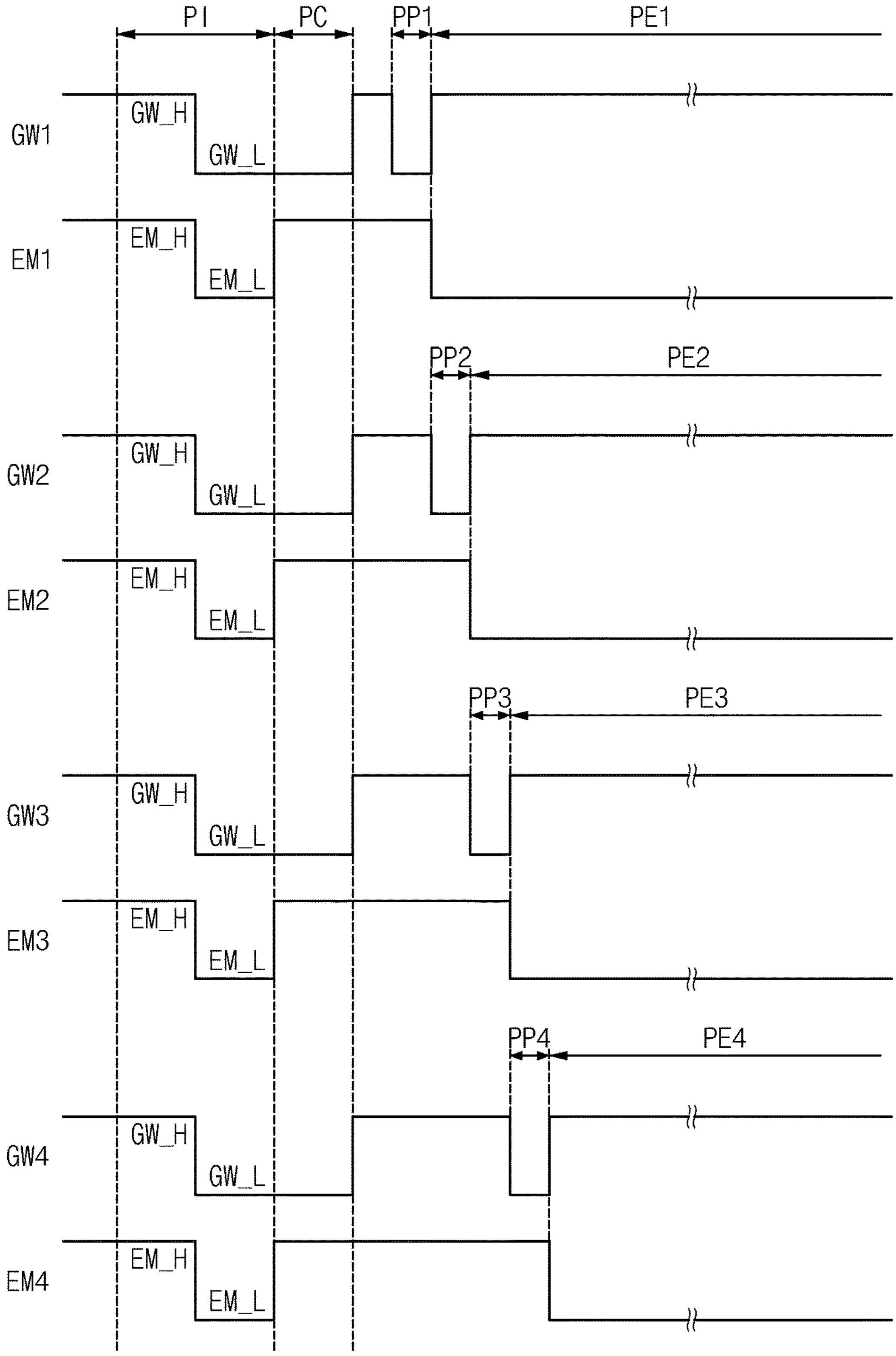
FIG. 11 is a waveform diagram illustrating write gate signals and emission control signals provided from a scan driver included in the display device in FIG. 8.

FIG. 11 is a waveform diagram illustrating write gate signals GW1, GW2, GW3, and GW4 and emission control signals EM1, EM2, EM3, and EM4 provided from the scan driver 120 included in the display device 100_1 in FIG. 8.

Referring to FIGS. 8 and 11, the scan driver 120 may respectively provide the first to fourth write gate signals GW1, GW2, GW3, and GW4 to the first to fourth pixel rows, and may respectively provide first to fourth emission control signals EM1, EM2, EM3, and EM4 to the first to fourth pixel rows.

The initialization period PI and the compensation period PC of one frame period may be simultaneously performed in the plurality of pixels PX. As illustrated in FIG. 11, timings of the initialization period PI and the compensation period PC of pixels included in the first to fourth pixel rows may be the same. Accordingly, the initialization period PI and the compensation period PC of the pixels included in the first to fourth pixel rows may be simultaneously performed.

The programming period and the emission period of one frame period may be sequentially performed on a row-by-row basis in the plurality of pixels PX. As illustrated in FIG. 11, a second programming period PP2 and a second emission period PE2 of pixels included in the second pixel row may be respectively shifted by one programming period (e.g., 1 horizontal time (H)) from a first programming period PP1 and a first emission period PE1 of pixels included in the first pixel row, a third programming period PP3 and a third emission period PE3 of pixels included in the third pixel row may be respectively shifted by one programming period from the second programming period PP2 and the second emission period PE2, and a fourth programming period PP4 and a fourth emission period PE4 of pixels included in the fourth pixel row may be respectively shifted by one programming period from the third programming period PP3 and the third emission period PE3. Accordingly, the first to fourth programming periods PP1, PP2, PP3, and PP4 and the first to fourth emission periods PE1, PE2, PE3, and PE4 of the pixels included in the first to fourth pixel rows may be sequentially performed on a row-by-row basis.

Figure 12:
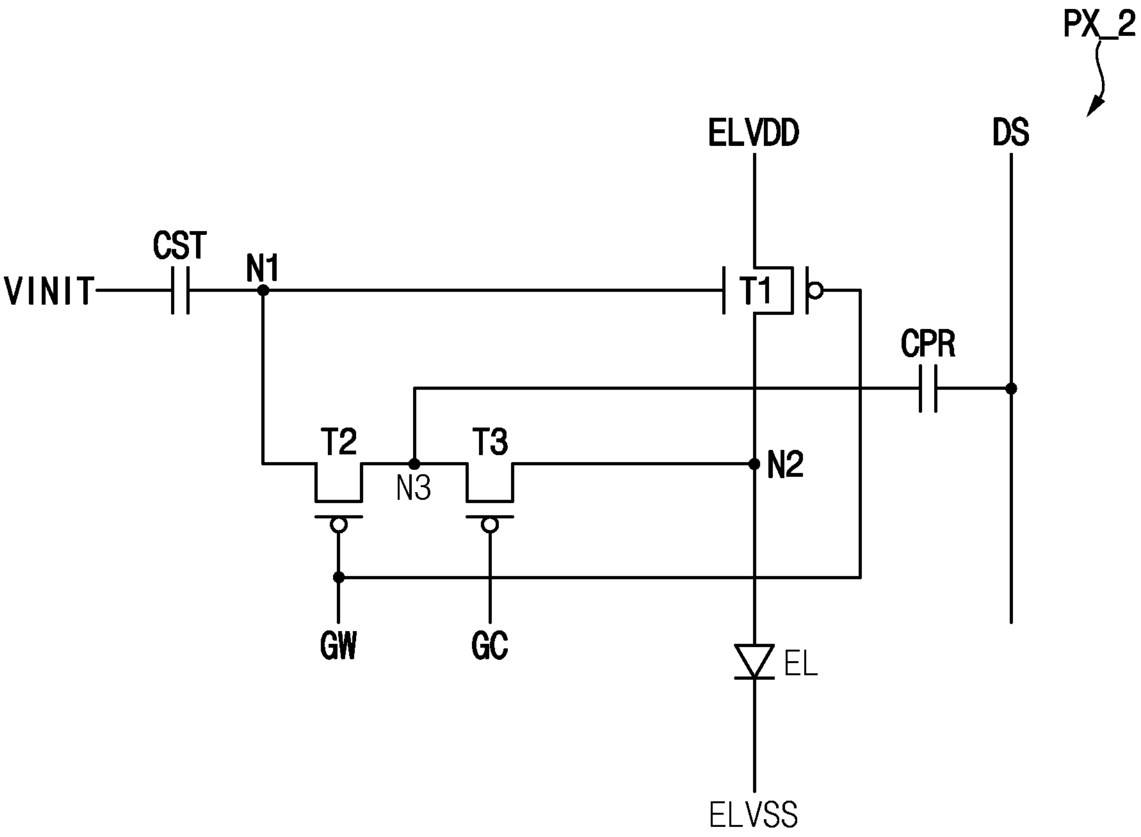
FIG. 12 is a circuit diagram illustrating a pixel according to an embodiment.

FIG. 12 is a circuit diagram illustrating a pixel PX_2 according to an embodiment.

Referring to FIG. 12, the pixel PX_2 may include a first transistor T1, a second transistor T2, a third transistor T3, a light emitting diode EL, a first capacitor CPR, and a second capacitor CST. Descriptions of components of the pixel PX_2 described with reference to FIG. 12, which are substantially the same as or similar to those of the pixel PX described with reference to FIG. 2, will not be repeated.

The first transistor T1 may include a first gate electrode receiving the write gate signal GW, a second gate electrode connected to the first node N1, a first electrode receiving the first power voltage ELVDD, and a second electrode connected to the second node N2. The first transistor T1 may be a double gate transistor including two gate electrodes. The first transistor T1 may be turned-on or turned-off in response to the write gate signal GW and a voltage of the first node N1.

In an embodiment, the first gate electrode of the first transistor T1 may correspond to the lower conductive layer BML of the display panel 110 in FIG. 7, and the second gate electrode of the first transistor T1 may correspond to the first gate layer GAT1 of the display panel 110 in FIG. 7.

Figure 13:
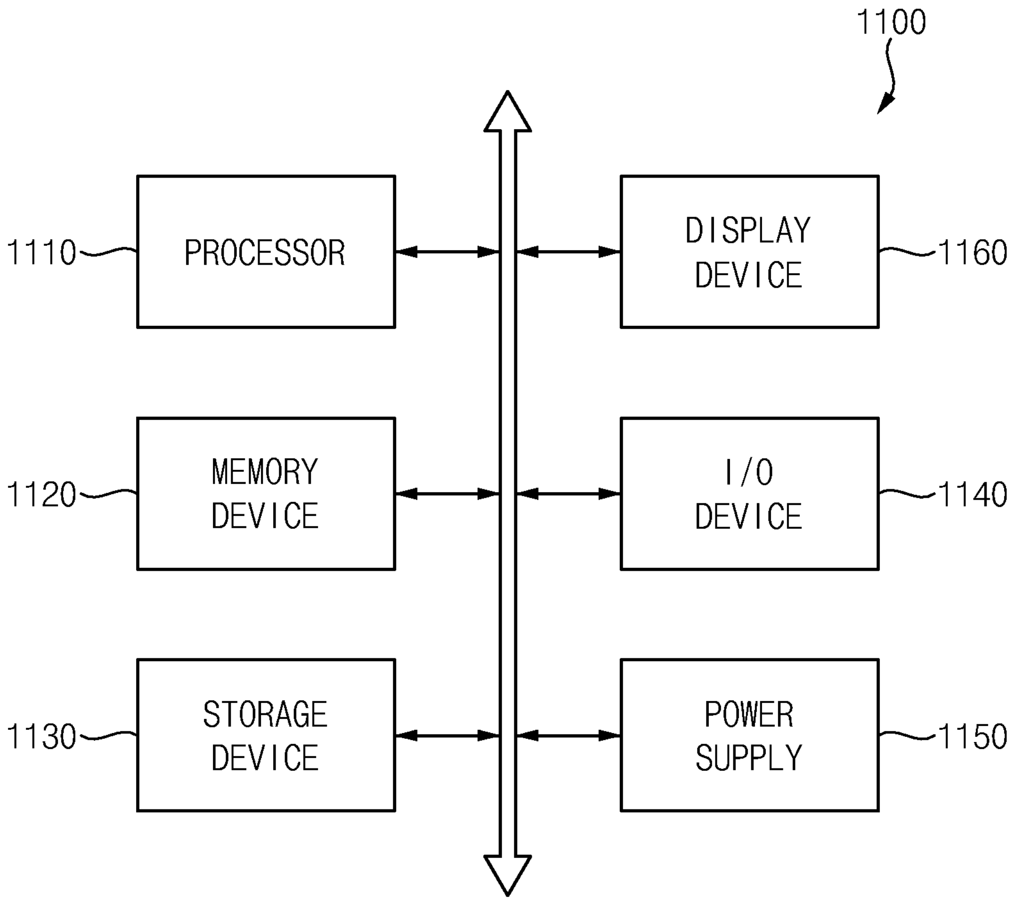
FIG. 13 is a block diagram illustrating an electronic apparatus including a display device according to an embodiment.

FIG. 13 is a block diagram illustrating an electronic apparatus 1100 including a display device 1160 according to an embodiment.

Referring to FIG. 13, the electronic apparatus 1100 may include a processor 1110, a memory device 1120, a storage device 1130, an input/output ("I/O") device 1140, a power supply 1150, and the display device 1160. The display device 1160 may correspond to the display device 100 in FIG. 1 or the display device 110_1 in FIG. 8. The electronic apparatus 1100 may further include a plurality of ports for communicating with a video card, a sound card, a memory card, a universal serial bus ("USB") device, etc.

The processor 1110 may perform particular calculations or tasks. In an embodiment, the processor 1110 may be a microprocessor, a central processing unit ("CPU"), or the like. The processor 1110 may be coupled to other components via an address bus, a control bus, a data bus, or the like. In an embodiment, the processor 1110 may be coupled to an extended bus such as a peripheral component interconnection ("PCI") bus.

The memory device 1120 may store data for operations of the electronic apparatus 1100. In an embodiment, the memory device 1120 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may include a solid state drive ("SSD") device, a hard disk drive ("HDD") device, a CD-ROM device, or the like. The I/O device 1140 may include an input device such as a keyboard, a keypad, a touchpad, a touch-screen, a mouse device, etc., and an output device such as a speaker, a printer, etc. The power supply 1150 may supply a power required for the operation of the electronic apparatus 1100. The display device 1160 may be coupled to other components via the buses or other communication links.

In a pixel included in the display device 1160, a light emitting diode may emit light based on a signal (a write gate signal or an emission control signal) applied to a second gate electrode of a first transistor, so that an emission duty of the pixel may increase and a luminance of the pixel may increase. Accordingly, a display quality of the display device 1160 may be improved.

The display device according to the embodiments may be applied to a display device included in a computer, a notebook, a mobile phone, a smart phone, a smart pad, a PMP, a PDA, an MP3 player, or the like.

Although embodiments have been described with reference to the drawings, the embodiments are examples, and may be modified and changed by a person having ordinary knowledge in the relevant field without departing from the spirit and scope of the following claims.

What is claimed is:

1. A pixel, comprising:

a first transistor which includes a first gate electrode connected to a first node, a second gate electrode which receives a write gate signal, a first electrode which receives a first power voltage, and a second electrode connected to a second node;

a second transistor which includes a gate electrode which receives the write gate signal, a first electrode connected to the first node, and a second electrode connected to a third node;

a third transistor which includes a gate electrode which receives a compensation gate signal, a first electrode connected to the third node, and a second electrode connected to the second node;

a light emitting diode which includes a first electrode connected to the second node and a second electrode which receives a second power voltage;

a first capacitor which includes a first electrode connected to the third node and a second electrode which receives a data voltage; and a second capacitor which includes a first electrode connected to the first node and a second electrode which receives a third power voltage, wherein a frame period includes:

an initialization period in which the first gate electrode of the first transistor and the first electrode of the light emitting diode are initialized;

a compensation period in which a threshold voltage of the first transistor is compensated;

a programming period in which the data voltage is written to the first gate electrode of the first transistor; and an emission period in which the light emitting diode emits a light, and wherein the write gate signal transitions from a turn-off voltage level to a turn-on voltage level in the initialization period, has the turn-on voltage level in the compensation period and the emission period, and has an intermediate voltage level between the turn-off voltage level and the turn-on voltage level in the programming period.

2. The pixel of claim 1, wherein the first power voltage has a low voltage level in the initialization period, and has a high voltage level in the compensation period and the emission period.

3. The pixel of claim 1, wherein the second power voltage has a high voltage level in the initialization period and the compensation period, and has a low voltage level in the emission period.

4. The pixel of claim 1, wherein the third power voltage has a low voltage level in the initialization period, and has a high voltage level in the compensation period, the programming period, and the emission period.

5. The pixel of claim 1, wherein the compensation gate signal has a turn-on voltage level in the initialization period and the compensation period, and has a turn-off voltage level in the programming period and the emission period.

6. A display device, comprising:

a display panel which includes a plurality of pixels; and a panel driver which drives the display panel, wherein each of the plurality of pixels includes:

a first transistor which includes a first gate electrode connected to a first node, a second gate electrode which receives a write gate signal or an emission control signal, a first electrode which receives a first power voltage, and a second electrode connected to a second node;

a second transistor which includes a gate electrode which receives the write gate signal, a first electrode connected to the first node, and a second electrode connected to a third node;

a third transistor which includes a gate electrode which receives a compensation gate signal, a first electrode connected to the third node, and a second electrode connected to the second node;

a light emitting diode which includes a first electrode connected to the second node and a second electrode which receives a second power voltage;

a first capacitor which includes a first electrode connected to the third node and a second electrode which receives a data voltage; and a second capacitor which includes a first electrode connected to the first node and a second electrode which receives a third power voltage, wherein a frame period of each of the plurality of pixels includes:

an initialization period in which the first gate electrode of the first transistor and the first electrode of the light emitting diode are initialized;

a compensation period in which a threshold voltage of the first transistor is compensated;

a programming period in which the data voltage is written to the first gate electrode of the first transistor; and an emission period in which the light emitting diode emits a light, and wherein the second gate electrode of the first transistor receives the write gate signal, and wherein the write gate signal transitions from a turn-off voltage level to a turn-on voltage level in the initialization period, has the turn-on voltage level in the compensation period and the emission period, and has an intermediate voltage level between the turn-off voltage level and the turn-on voltage level in the programming period.

7. The display device of claim 6, wherein the programming period and the emission period are sequentially performed on a row-by-row basis in the plurality of pixels.

8. The display device of claim 6, wherein the initialization period and the compensation period are simultaneously performed in the plurality of pixels.

9. The display device of claim 6, wherein the second gate electrode of the first transistor receives the emission control signal, and wherein the write gate signal transitions from a turn-off voltage level to a turn-on voltage level in the initialization period, has the turn-on voltage level in the compensation period and the programming period, and has the turn-off voltage level in the emission period.

10. The display device of claim 9, wherein the emission control signal transitions from a turn-off voltage level to a turn-on voltage level in the initialization period, has the turn-off voltage level in the programming period, and has the turn-on voltage level in the emission period.

* * * * *